US012750632B2

(12) United States Patent
De Bruijn

(10) Patent No.: US 12,750,632 B2
(45) Date of Patent: Sep. 29, 2026

(54) SPATIAL EXTENT MODELING FOR VOLUMETRIC AUDIO SOURCES

(71) Applicant: Telefonaktiebolaget LM Ericsson (publ), Stockholm (SE)

(72) Inventor: Werner De Bruijn, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 503 days.

(21) Appl. No.: 18/017,291

(22) PCT Filed: Jul. 22, 2020

(86) PCT No.: PCT/EP2020/070606
§ 371 (c)(1),
(2) Date: Jan. 20, 2023

(87) PCT Pub. No.: WO2022/017594
PCT Pub. Date: Jan. 27, 2022

(65) Prior Publication Data

US 2023/0353968 A1 Nov. 2, 2023

(51) Int. Cl.
*H04S 7/00* (2006.01)

(52) U.S. Cl.
CPC ........... *H04S 7/304* (2013.01); *H04S 2400/11* (2013.01)

(58) Field of Classification Search
CPC ... H04S 7/304; H04S 2400/11; H04S 2420/13
USPC .......................................................... 381/303
See application file for complete search history.

(56) References Cited

U.S. PATENT DOCUMENTS

2003/0235293 A1* 12/2003 Walker ................ H04M 1/2535 379/406.01
2017/0325045 A1 11/2017 Baek et al.
2019/0020968 A1 1/2019 Suenaga et al.
2020/0128347 A1 4/2020 Schissler

FOREIGN PATENT DOCUMENTS

AU 2020 200 378 A1 2/2020
EP 3 550 860 A1 10/2019
JP 2010010844 A 1/2010

(Continued)

OTHER PUBLICATIONS

International Search Report and Written Opinion dated Mar. 24, 2021 in International Application No. PCT/EP2020/070606 (11 pages).

(Continued)

*Primary Examiner* — Vivian C Chin
*Assistant Examiner* — Douglas J Suthers
(74) *Attorney, Agent, or Firm* — Rothwell, Figg, Ernst & Manbeck, P.C.

(57) ABSTRACT

A method (800) for rendering an audio source for a listener. The method comprises obtaining (s802) a spatial extent value indicating a spatial extent of the audio source and obtaining (s804) a distance value specifying a distance between the audio source and the listener. The method also comprises determining (s806) whether the distance value is smaller than a threshold distance value. The method further comprises as a result of determining that the distance value is smaller than the threshold distance value, rendering (s808) to the listener the audio source using an effective spatial extent value.

25 Claims, 9 Drawing Sheets

(56) References Cited

FOREIGN PATENT DOCUMENTS

| | | | |
|---|---|---|---|
| JP | 2017-175356 | A | 9/2017 |
| WO | 2019/067370 | A1 | 4/2019 |
| WO | 2020/144062 | A1 | 7/2020 |

OTHER PUBLICATIONS

Ureda, M. S., "Pressure Response of Line Sources", Pressure Response of Line Arrays, Audio Engineering Society Convention Paper 5649 Presented at the 113th Convention Oct. 5-8, 2002, Los Angeles, CA. USA (8 pages).

* cited by examiner

SPATIAL EXTENT MODELING FOR VOLUMETRIC AUDIO SOURCES

CROSS REFERENCE TO RELATED APPLICATIONS

This application is a 35 U.S.C. § 371 National Stage of International Patent Application No. PCT/EP2020/070606, filed 2020 Jul. 22.

TECHNICAL FIELD

Disclosed are embodiments related to methods and systems for spatial extent modeling for volumetric audio sources.

BACKGROUND

An XR (a Virtual Reality, an Augmented Reality, or a Mixed Reality) scene may contain many audio sources that are spatially distributed within the scene's space. Many of these audio sources have specific, clearly defined locations in space and can be considered as point-like sources. These audio sources are typically rendered to the listener as point-like audio objects.

An XR scene, however, also often contains audio sources that are of a volumetric nature rather than a point-like nature, meaning that they have a certain spatial extent in one or more spatial dimensions.

In some cases, such a volumetric audio source may correspond to a single physical entity (e.g., an airplane, a piano, a train, a transportation pipe in a factory, etc.) in the scene. Some of these volumetric audio sources may radiate audio as single coherent audio sources while others may radiate audio more like spatially extended diffuse audio sources.

In other cases, instead of corresponding to a single physical entity, a volumetric audio source may represent an area in the scene that contains a multitude (and perhaps even a continuum) of independent audio sources which together can be considered as a compound volumetric audio source. Examples of this type of volumetric audio source are the seashore at a beach and a busy highway. In the busy highway example, although each car is in principle an independent audio source, the highway with many cars on it can be considered as a compound volumetric audio source.

Like the seashore and the highway examples discussed above, in many cases, the spatial extent of a volumetric audio source may be very large in one or more of its spatial dimensions, and in some cases it may effectively even be infinitely large (e.g., in relation to the distance of a listener to the volumetric audio source).

SUMMARY

Typically, scene description data for an XR scene specifies the extent of a volumetric audio source in terms of the source's physical geometry (e.g., the source's physical size in one or more dimensions, or a geometrical mesh structure that describes the source's physical geometry). This specified physical geometry of the source typically relates directly to the physical geometry of some corresponding physical (often also visual) entity (e.g., a car, a piano, etc.) in the XR scene.

As discussed above, however, volumetric audio sources may physically be very large in one or more dimensions, like the seashore and busy highway discussed above. In such cases, the physical size or the geometry of the volumetric audio source as typically specified in its extent data is often not very suitable to be used directly for rendering the audio source to a listener.

Specifically, in many cases, only a limited part of the geometrical extent of a volumetric audio source contributes in a significant way to the audio energy received by a listener at a given listening position. This is the case for very large (especially for "infinitely" large) volumetric sources, where the outer parts of the geometrical extent are so far away from the listener that, due to distance and medium attenuation, no significant audio energy reaches the listener from these outer parts.

It may also be the case if a listener comes close to a moderately sized volumetric audio source such that the audio energy reaching the listener from the parts of the source close to the listener essentially overpowers the audio energy coming from parts further away from the listener. Thus, the "acoustically relevant" part of a given volumetric audio source may be dependent on the listener's position relative to the source.

Therefore, for large volumetric audio sources, it is often not very appropriate or convenient to simply use the specified geometrical extent as a direct measure for how wide or tall the audio source should be rendered to a listener at a given listening position. Indeed, doing so may result in various problems.

One problem of using the specified geometrical extent of a volumetric audio source directly for audio rendering is that the resulting subjective spatial extent of the source (e.g., the size of the source as perceived by a listener) may be unnatural (e.g., unnaturally wide—the spatial extent may be perceived wider than would be the case in real life). This problem may occur, for example, in a rendering scenario where the audio of a volumetric audio source is rendered to a listener using virtual loudspeakers positioned at the edges of the source's specified geometrical extent. As explained above, these virtual loudspeakers are in many cases spaced too widely.

Specifying the intended perceived spatial extent of the source instead of its geometric extent would also be problematic because the intended perceived spatial extent is valid for one specific listening position only, and deriving the intended perceived spatial extent for other listening positions (as would be needed in 6 degrees of freedom XR use cases) may not be straightforward or even possible.

Furthermore, in rendering scenarios where advanced physical modeling techniques are used to accurately render the audio radiated by a volumetric audio source, the computational complexity that is required for the rendering typically grows quickly as the physical size of the source increases. For large volumetric sources (e.g., the seashore and busy highway discussed above, and a passing train), using the specified geometrical extent of the source directly for rendering the source to a listener may easily require excessive computational effort, especially in real-time interactive XR applications. In addition, a significant part of this computational effort may even be spent unnecessarily since it is used for rendering audio that is radiated by parts of the volumetric source that do not even contribute significantly to the audio at the specific listener position.

Thus, in order to be able to render large volumetric audio sources in a perceptually appropriate and computationally efficient way, it would be very beneficial to have a method for modeling the acoustically relevant spatial extent of a volumetric audio source at a given listening position based on the source's specified geometrical extent and possibly other properties. It would be particularly desirable if the model would be a very simple one so that it can be implemented as a light-weight add-on to existing real-time renderer architectures.

Embodiments of this disclosure are directed to methods and systems for providing a very low-complexity parametric model for determining the effective spatial extent of a volumetric audio source—i.e., the part of the geometrical extent of the volumetric audio source, which contributes significantly to the audio received by a listener at a given listening position.

Parameters of the model include (i) a size parameter indicating the size of the geometrical extent of the volumetric audio source in one or more dimensions and/or (ii) a distance parameter indicating a distance of the listener to the volumetric audio source.

The parameters of the model may also include (i) a parameter indicating a coherence property of the volumetric audio source (e.g., coherent, diffuse, or something in between) and/or (ii) a frequency parameter (in case of a (partially) coherent source).

The determined effective spatial extent may be used in rendering the volumetric audio source to the listener. For example, the determined effective spatial extent may be used to (i) determine a target auditory rendering size for the volumetric audio source at the given listening position, and/or (ii) select only the acoustically relevant subpart of the geometrical extent of the volumetric audio source for rendering the audio of the volumetric source to the listener while discarding other acoustically non-relevant parts of the geometrical spatial extent for rendering.

In one aspect there is provided a method for rendering an audio source for a listener. The method includes obtaining a spatial extent value indicating a spatial extent of the audio source and obtaining a distance value specifying a distance between the audio source and the listener (which is also known as the "observation distance"). The method also includes determining whether the distance value is smaller than a threshold distance value. The method further includes as a result of determining that the distance value is smaller than the threshold distance value, rendering to the listener the audio source using an effective spatial extent value.

In another aspect a computer program is provided. The computer program comprises instructions which when executed by processing circuitry causes the processing circuitry to perform the method of any one of the embodiments disclosed herein. In another aspect there is provided a carrier containing the computer program, wherein the carrier is one of an electronic signal, an optical signal, a radio signal, and a computer readable storage medium.

In another aspect an apparatus is provided which apparatus is adapted to perform the method of any one of the embodiments disclosed herein. In one embodiment the apparatus comprises processing circuitry; and a memory, the memory containing instructions executable by the processing circuitry, whereby the apparatus is adapted to perform the method of any one of the embodiments disclosed herein.

Advantages

For large volumetric audio sources, using the effective spatial extent according to the embodiments of this disclosure enables a more natural and realistic spatial rendering of the sources than directly using the sources' geometrical extent.

Also compared to directly specifying an intended perceived spatial extent of a volumetric audio source, which is only valid for a specific listening position, the modeled effective spatial extent according to the embodiments of this disclosure is valid at any listening position.

Furthermore, in some rendering scenarios, the methods and the systems according to the embodiments of this disclosure enable better computational efficiency in rendering the audio of a large volumetric audio source as only parts of the geometrical extent that are acoustically relevant at the given listening position are considered in the rendering.

Also, in the embodiments of this disclosure, the parametric model for determining the effective spatial extent is very simple and can easily be implemented as a light-weight add-on to existing render architectures.

BRIEF DESCRIPTION OF THE DRAWINGS

The accompanying drawings, which are incorporated herein and form part of the specification, illustrate various embodiments.

DETAILED DESCRIPTION

Effective Spatial Extent: Qualitative Model

As explained above, it is desirable to find a model that can infer the acoustically relevant, or effective, spatial extent of a volumetric audio source for a listener at a given listening position, from some of the source's physical characteristics.

A reasonable general starting assumption for developing such a model is that parts of a volumetric audio source that do not significantly contribute to the source's perceived loudness at a specific listening position (in the sense that the listener is not able to perceive any difference in loudness regardless of whether the audio coming from those parts is included in the rendering or not) will also not significantly contribute to the source's perceived spatial properties (including the source's perceived spatial extent) at that same listening position.

Figure 1:
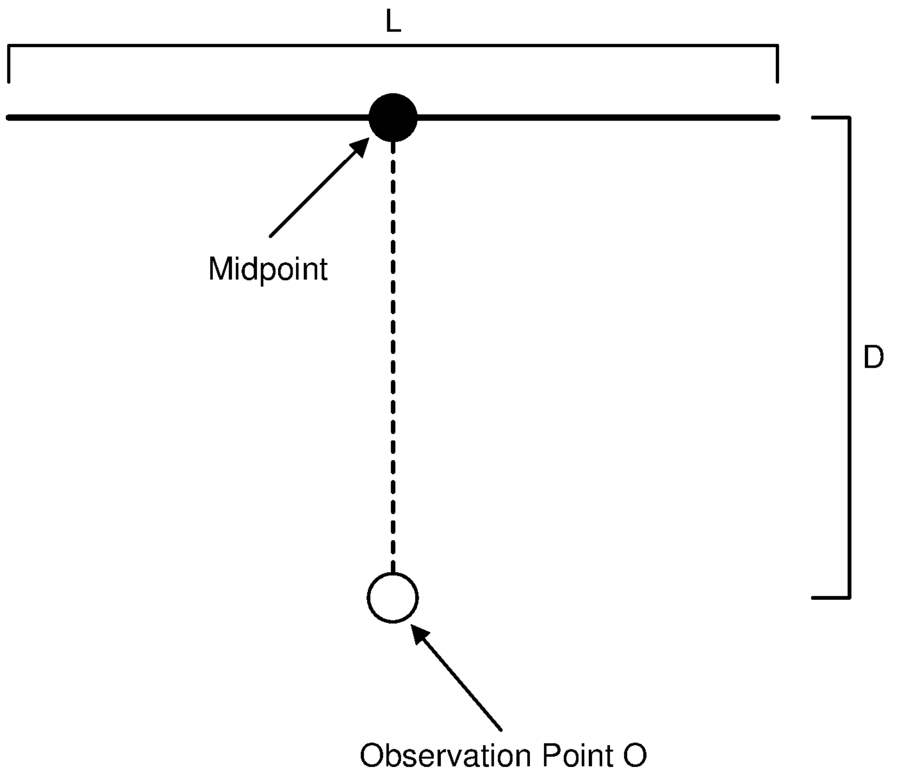
FIG. 1 shows different parameters used for audio rendering.

The starting point for building the model is the simple case of a 1-dimensional volumetric audio source (i.e., a line source) that has a variable geometrical spatial extent of size L in a single dimension (i.e., an acoustic line source with a variable length L). For this line source, the behavior of the Sound Pressure Level (SPL) at an observation point O located at a perpendicular distance D with respect to the line source's midpoint may be evaluated as a function of the source length L (See FIG. 1).

If the length L of the line source is very small, the line source is essentially a point source. As the length L steadily increases at both sides of the line source with a constant source strength density along the length (e.g., at the length 2L, the source radiates twice the amount of acoustic energy than at the length L), it is expected that the SPL at the observation point O increases too.

As the source length L increases, however, the contributions from the outer edges of the source to the SPL at the observation point become smaller and smaller, due to the increasing distance of these outer parts to the observation point. Thus, the rate at which the SPL increases as a function of increasing the length L may decrease. At some point, when the source becomes very long, the rate that the SPL increases may become insignificant such that the SPL will no longer increase with further increase of the source length. In other words, the SPL will saturate beyond a certain length ($L_{eff}$) of the line source.

For an infinitely long line source having a constant source strength density, at different observation points O different segments of the size $L_{eff}$ of the infinitely long line source may be the acoustically significant parts of the source. In other words, as a listener moves along a line parallel to the infinitely long line source, the listener effectively perceives the source through a spatial window of size $L_{eff}$ that moves along with the listener.

In some embodiments of this disclosure, the effective spatial extent of a 1-dimensional volumetric audio source (i.e., a line source) is defined as the size of the smallest source segment for which the sound level at a given listening position due to that segment is less than a threshold sound level difference value below the sound level of the complete source. In other words, adding the parts of the line source beyond the edges of the effective spatial extent does not add more than the threshold sound level difference value to the sound level at the listening position.

The threshold sound level difference value used in determining the effective spatial extent may be chosen in different ways but may be most conveniently defined in relative terms (e.g., as a certain percentage of the linear sound pressure due to the complete source or as a certain number of decibels below the SPL of the complete source).

Because the goal is linking the physical size of a source to a corresponding perceived auditory size, it is desirable to select the threshold sound level difference value such that it has a relation to this perceived auditory size. Specifically, it may be desirable to select the threshold sound level difference value such that the resulting effective spatial extent corresponds to the size of the smallest source segment for which the loudness (which is a perceptual measure) is indistinguishable from the loudness of the complete source. In this context, a perceptually relevant criterion for setting the threshold sound level difference value is therefore the just-noticeable-difference (JND) for loudness, which from acoustical perception literature is known to be approximately 1 dB SPL.

Effective Spatial Extent: Quantitative Model

A volumetric audio source may be physically modeled as a dense distribution of point sources. For a 1-dimensional volumetric audio source, the total pressure response $P_{line}$ may be expressed as:

$$P_{line}(\omega, \vec{r}) = \sum_{i=1}^{N} A_i(\omega) \frac{e^{-ikr_i}}{r_i}, \tag{1}$$

where N is the total number of the point sources used to model the 1-dimensional volumetric audio source, $A_i(\omega)$ is the complex amplitude of the $i^{th}$ point source at the radial frequency ω, k is the wavenumber ω/c, with c the speed of sound in air, and $r_i$ is the distance from the $i^{th}$ point source to the observation point $\vec{r}$.

The Sound Pressure Level (SPL) of the 1-dimensional volumetric source then may be expressed as:

$$SPL_{line}(\omega, \vec{r}) = 20 \log_{10}(|P_{line}(\omega, \vec{r})|). \tag{2}$$

When modeling a continuous volumetric source in this way, a sufficiently small spacing between the individual point sources should be used in order to obtain accurate results over the whole frequency range of interest (e.g., 0-20 kHz).

There are various types of 1-dimensional volumetric audio sources, which include a coherent 1-dimensional volumetric audio source (of which all points coherently radiate the same acoustical signal) and a diffuse 1-dimensional volumetric source (of which all points radiate independent, fully uncorrelated signals). These two extreme types of 1-dimensional volumetric audio sources behave significantly differently in various aspects, as described in more detail below.

Diffuse 1-Dimensional Volumetric Audio Source

Because a diffuse volumetric audio source can be seen as a dense distribution of independent point sources that all have a frequency-independent SPL-vs-distance behavior, the behavior of the diffuse volumetric audio source is frequency-independent too. Therefore, the following results are valid for any individual frequency as well as for broadband.

Figure 2:
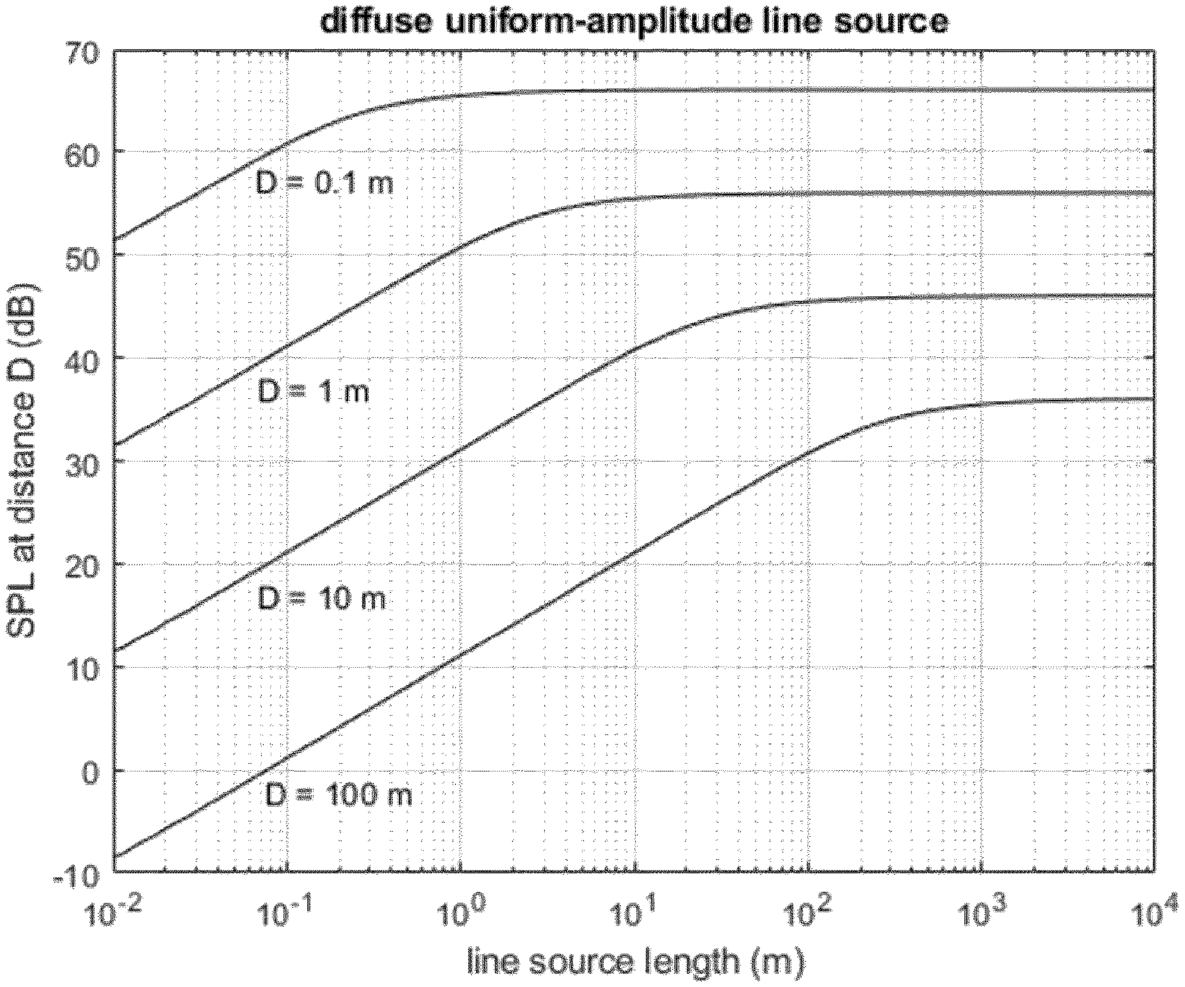
FIG. 2 shows the behavior of the Sound Pressure Level (SPL) of a fully incoherent, or diffuse, 1-dimensional volumetric audio source according to an embodiment.

FIG. 2 shows simulation results for the total SPL of a fully incoherent, or diffuse, 1-dimensional volumetric audio source as a function of line source length L, for observation distances D of 0.1, 1, 10, and 100 m.

One common characteristic of all four curves is that they have two distinct regions: at small line source lengths (or at large observation distances), the SPL increases at a constant rate of 3 dB per doubling of line source length L (note the logarithmic scale on the horizontal axis), while at large line source lengths (or at small observation distances), the SPL becomes constant as a function of L.

The 3 dB SPL increase per doubling of length at small line source lengths (or at large observation distances) can be explained from the fact that, in the expression for the total pressure (equation 1), the distances $r_i$ from the individual point sources to the observation point are essentially equal such that only the complex amplitudes $A_i$ in equation 1 are relevant in determining the total pressure. If the source powers for the individual point sources are assumed to be equal, it can easily be shown from equations 1 and 2 that the following relationship holds:

$$SPL_{line,diffuse} \propto 10 \log_{10}(N). \tag{3}$$

Equation 3 implies a 3 dB increase of the SPL when doubling the number of point sources N. If it is further assumed that the spacing between the individual point sources is uniform, then equation 3 implies a 3 dB SPL increase for a doubling of the line source length L.

The saturation of the SPL to a constant value at large line source lengths (or at small observation distances) is consistent with the qualitative model discussed above. As explained above, the saturation of the SPL can be explained from the fact that as the length increases, the contributions of the newly added point sources at the outer edges become less and less significant, and eventually completely insignificant. In other words, once a diffuse 1-dimensional volumetric audio source has reached a certain line source length, then increasing the length further does not lead to a further increase of the SPL.

Comparing the curves for the different observation distances indicates that the line source length L at which the transition between the two regions—the region where the SPL increases and the region where the SPL is substantially maintained at a constant value-occurs depends on the observation distance, with the transition length being larger for larger observation distances.

The effective spatial extent of a very long diffuse 1-dimensional volumetric audio source may be estimated from the curves shown in FIG. 2 by finding the line source length L where the SPL is a certain threshold sound level difference value below the saturation SPL observed at very large source lengths. The line source length at which the SPL saturates is found to be proportional to the observation distance D.

If the JND for loudness differences is chosen as a criterion for setting the threshold sound level difference value, the threshold sound level difference value equals approximately 1 dB SPL. Then, the line source length at which the SPL saturates (i.e., the −1 dB point in this specific case) is found to have a value of approximately 6 times the observation distance D.

Thus, the effective spatial extent of a source that has a length of 6D or more is equal to 6D (i.e., it is proportional to the observation distance D). Equivalently, at observation distances smaller than L/6, the spatial extent is equal to 6D.

For line source lengths smaller than 6D or equivalently observation distances larger than L/6, the effective spatial extent is simply equal to the line source length L (i.e., every part of the 1-dimensional volumetric source contributes significantly to the sound received at the observation point). This characterization enables a more efficient and realistic rendering of audio sources that behave like a 1-dimensional diffuse volumetric source.

The effective spatial extent may be expressed either (i) in terms of length or (ii) in terms of an angular span ("opening angle")). In case the effective spatial extent is expressed in terms of length, the effective spatial extent for line source lengths larger than the saturation length is proportional to the observation distance/(e.g., the effective spatial extent is equal to 6D for some audio sources). In contrast, in the case where the effective spatial extent is expressed in terms of an angular span ("opening angle (OA)"), the effective spatial extent has a constant value (i.e., independent of the observation distance). The general expression for the opening angle (OA) is: OA=2*a tan((0.5*effective spatial extent in units of length)/D), where a tan is the arc Tangent function. For a diffuse source, the effective spatial extent in units of length is 6D, thus the expression for OA becomes: OA=2*a tan((0.5*6D)/D)=2*a tan (3)=143 degrees. Accordingly, if the renderer obtains OA and D, then the renderer can calculate the effective spatial extent in units of length.

Another common characteristic of the curves shown in FIG. 2 is that in the region where the SPL increases with 3 dB per doubling of length, the SPL decreases by 20 dB for an increase of observation distance by a factor of 10, or equivalently by 6 dB per doubling of distance. This means that, in this region, the 1-dimensional diffuse volumetric audio source behaves like a point source in terms of SPL (i.e., $p \propto 1/r$). In contrast, in the region where the SPL is constant as a function of line source length, the SPL decreases by only 10 dB for each increase of distance by a factor of 10, or by 3 dB per doubling of distance. This means that, in this region, the 1-dimensional diffuse volumetric source behaves like a theoretical line source (i.e. $p \propto 1/\sqrt{r}$). This distance-dependent SPL behavior of finite length line sources is described in U.S. Provisional Patent Application No. 62/950,272, filed on Dec. 19, 2019.

Coherent 1-Dimensional Volumetric Audio Source

For a fully coherent uniform 1-dimensional volumetric audio source, all the amplitudes $A_i$ in equation 1 are identical (i.e., $A_i = A \forall i$). Due to the frequency-dependency and coherency of the phase terms $e^{-ikr_i}$ of individual point sources of the volumetric audio source, the total pressure response of the volumetric audio source will be frequency-dependent too, and thus it is necessary to analyze the effective spatial extent for individual frequencies as well as for broadband.

Figure 3:
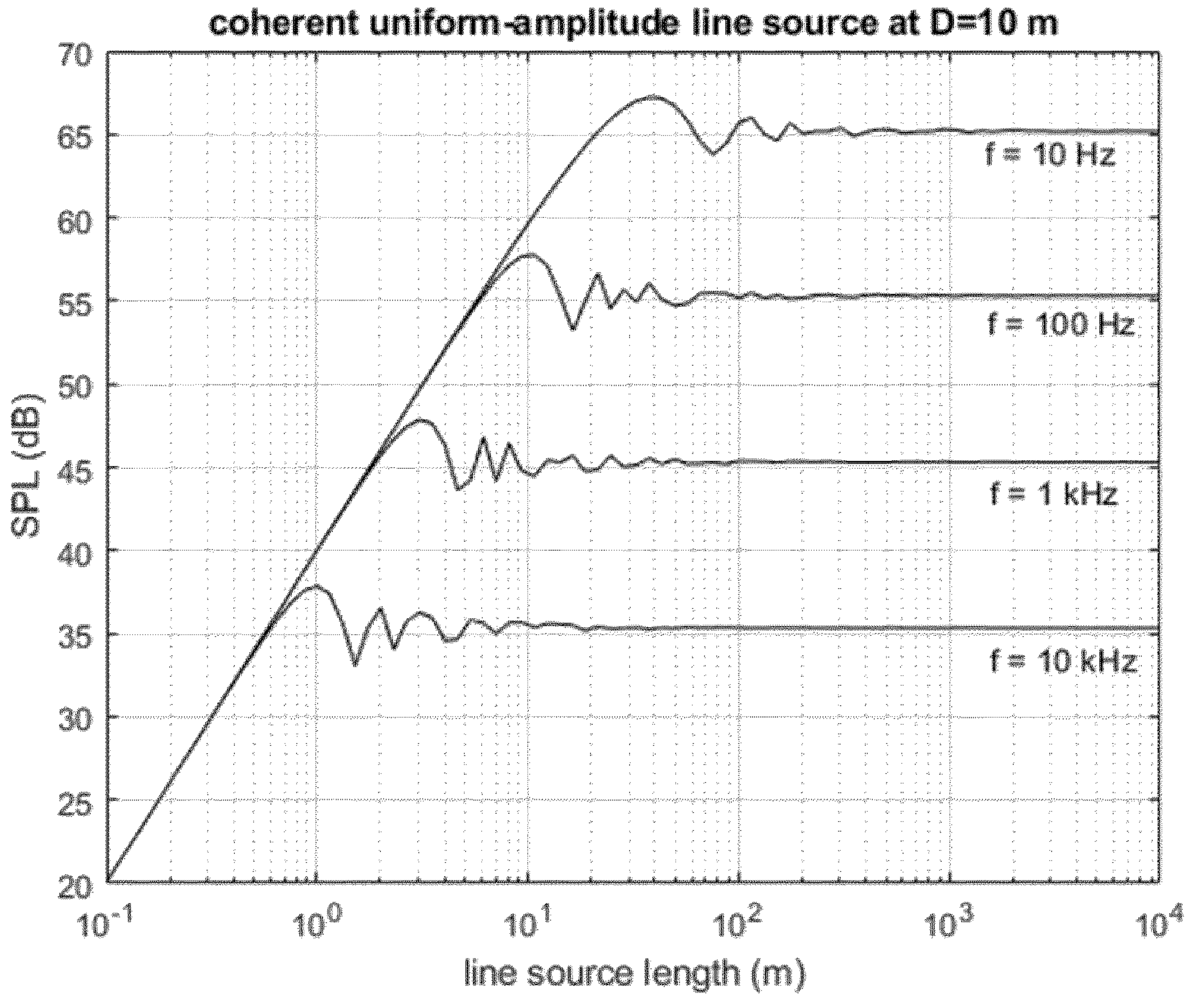
FIG. 3 shows the behavior of the SPL of a coherent 1-dimensional volumetric audio source according to an embodiment.

FIG. 3 shows the SPL response as function of line source length for various frequencies and one observation distance. Like the diffuse 1-dimensional volumetric audio source, for the coherent 1-dimensional volumetric audio source, there is an expected saturation of the SPL beyond a certain line source length for each of the individual frequencies, but unlike the curves shown in FIG. 2, the saturation length now depends on the frequency.

The SPL at small line source lengths increases at a rate of 6 dB per doubling of length instead of 3 dB as shown in FIG. 2 for the diffuse 1-dimensional volumetric audio source. Following the same reasoning as in the case of the diffuse source, that for small line source lengths (or large observation distances), the distances $r_i$ from the individual point sources to the observation point are essentially equal, the pressures $P_i$ for the individual point sources of the volumetric audio source are all identical to a common pressure P so that (as before with the assumption of equal power and equal spacing for the individual point sources) equation 1 reduces to $$P^2_{line,coherent} = N^2 P^2, \tag{4}$$

leading to:

$$SPL_{line,coherent} \propto 20 \log_{10}(N), \tag{5}$$

which is indeed consistent with the observed 6 dB increase per doubling of length L.

Based on the analysis of corresponding simulation results for many other observation distances and using the same way to determine the effective spatial extent as done for the diffuse source, for small observation distances (or large line source lengths), the effective spatial extent is frequency-dependent and may be expressed as being equal to $c_1\sqrt{D/f}$ (with f being the frequency and $c_1$ being a constant), while the effective spatial extent is again simply equal to line source length L for large observation distances (or small line source lengths).

The transition distance between the two regions was found to be proportional to $L^2 f$, with the proportionality factor being equal to $1/c_1^2$. For the specific choice, as before, of using the JND for loudness differences (1 dB SPL) as threshold sound level difference value for finding the saturation length, $c_1$ was empirically found to be equal to approximately 18.4.

As shown above, the behavior of the coherent 1-dimensional volumetric audio source is frequency-dependent and will typically also be rendered in a frequency-dependent way. To observe the broadband behavior of the coherent 1-dimensional volumetric audio source, a simulation may be carried out for 128 evenly spaced frequencies from 20 Hz to 20 kHz and the results for all individual frequencies may be summed to obtain the broadband result, implying a white source spectrum assumption.

Figure 4:
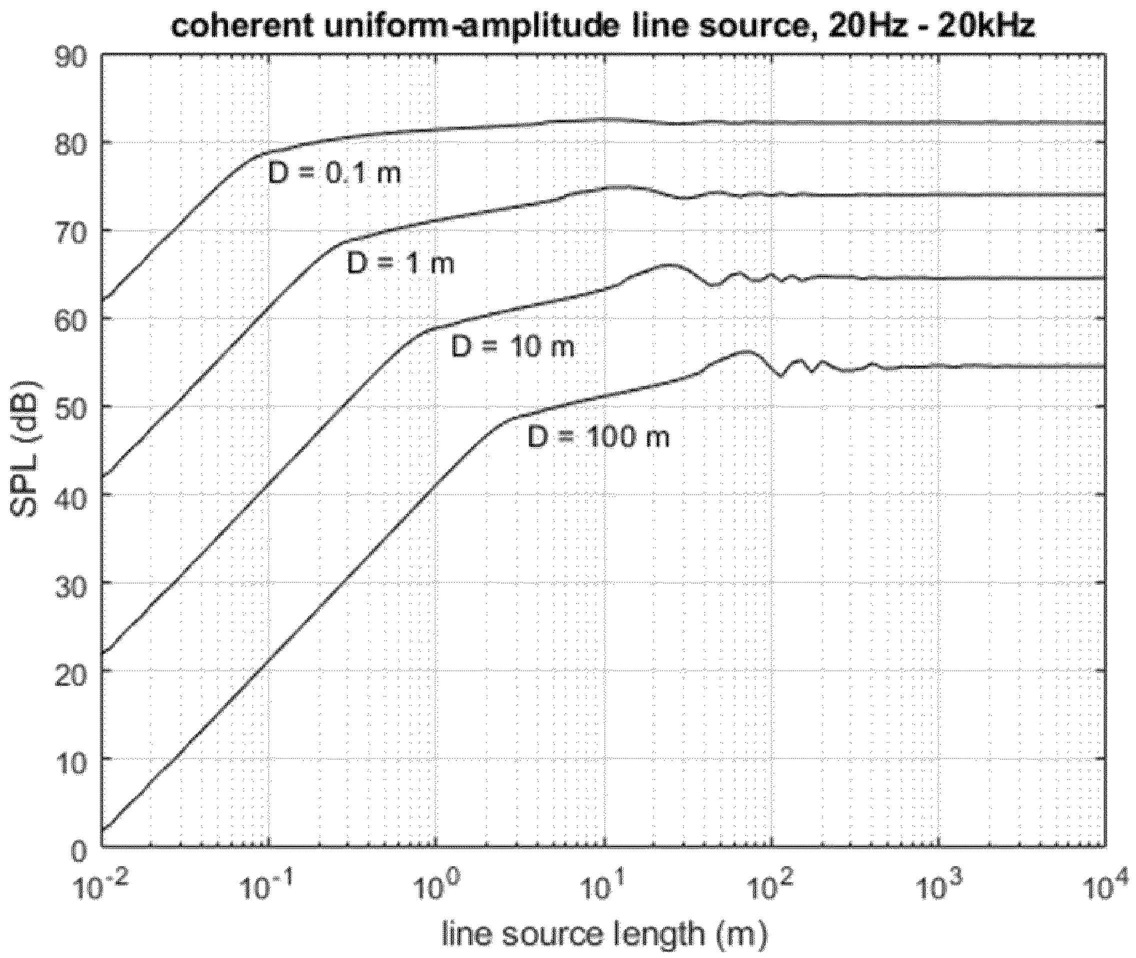
FIG. 4 shows the behavior of the SPL of a coherent 1-dimensional volumetric audio source according to an embodiment.

FIG. 4 shows the broadband SPL as function of line source length L for several observation distances D. Comparing FIG. 4 to FIG. 2 (which shows the SPL of the frequency-independent diffuse source), the overall broadband behaviors of the coherent source and the diffuse source is quite similar, especially for very small and very large line source lengths. The main differences are that (1) the transition region of the coherent source is much broader and (2) there is some ripple within the transition region of the coherent source. In addition, at large observation distances, the SPL for the coherent source increases by 6 dB per doubling of line source length (as observed for individual frequencies) instead of the 3 dB per doubling of line source length for the diffuse source.

For small observation distances (or large line source lengths), the broadband effective spatial extent is proportional to the square root of the observation distance D, i.e. $c_2\sqrt{D}$, while it is again simply equal to line source length L for large observation distances (or small source lengths). The transition distance between the two regions is proportional to the square of line source length L, with the proportionality factor being equal to $1/c_2^2$. For the specific choice of using the JND for loudness differences (1 dB SPL) as threshold sound level difference value for finding the saturation length, $c_2$ was found to be approximately equal to 3.5.

Summary of the Results from the Simulations

The effective spatial extent of a 1-dimensional volumetric audio source is equal to line source length L for observation distances larger than a certain transition distance (a.k.a., the threshold distance value) (or for line source lengths smaller than a certain transition length).

For observation distances smaller than the transition distance (or for line source lengths larger than the transition length), the effective spatial extent is proportional to observation distance D in the case of a diffuse 1-dimensional volumetric audio source while it is proportional to the square root of D for a coherent 1-dimensional volumetric audio source.

The transition distance is proportional to source length/for a diffuse 1-dimensional volumetric audio source while for a coherent 1-dimensional volumetric audio source, the transition distance is proportional to the square of L.

Parametric Model for the Effective Spatial Extent

The simulation results discussed above lead to the following parametric model for the effective spatial extent $L_{eff}$ of a 1-dimensional volumetric audio source of length L, as a function of observation distance D:

Diffuse 1-dimensional volumetric source:

$$L_{eff} \approx \begin{cases} c_0 D; & D \le L/c_0 \\ L; & D > L/c_0 \end{cases} \tag{6}$$

Coherent 1-dimensional volumetric source, frequency-dependent:

$$L_{eff} \approx \begin{cases} c_1\sqrt{D/f}; & \sqrt{D/f} \le L/c_1 \quad \left(\equiv D \le f\ L^2/c_1^2\right) \\ L; & \sqrt{D/f} > L/c_1 \quad \left(\equiv D > f\ L^2/c_1^2\right) \end{cases} \tag{7}$$

Coherent 1-dimensional volumetric source, broadband:

$$L_{eff} \approx \begin{cases} c_2\sqrt{D}; & \sqrt{D} \le L/c_2 \quad \left(\equiv D \le L^2/c_2^2\right) \\ L; & \sqrt{D} > L/c_2 \quad \left(\equiv D > L^2/c_2^2\right) \end{cases} \tag{8}$$

For the specific choice of the threshold sound level difference value of 1 dB (JND for loudness), the constants were empirically found to have the following approximate values: $c_0 \approx 6$, $c_1 \approx 18.4$, and $c_2 \approx 3.5$.

NUMERICAL EXAMPLES

The followings are examples that illustrate how the parametric model for effective spatial extent affects the rendering of 1-dimensional volumetric audio sources.

Example 1

For an "infinitely" long diffuse source (e.g., the shoreline at a beach), the effective spatial extent will be in the "$c_0D$" range for a listener at any practically relevant observation distance. Thus, the effective spatial extent will be: 6 m (143 degrees) at an observation distance of 1 m; 60 m (143 degrees) at an observation distance of 10 m; and 600 m (143 degrees) at an observation distance of 100 m.

Example 2

For a diffuse 1-dimensional volumetric source with length L=10 m, the effective spatial extent will be: 0.6 m (143 degrees) at an observation distance of 0.1 m, 6 m (143 degrees) at an observation distance of 1 m, 10 m at any observation distance larger than 1.7 m (which results in 53 degrees at 10 m observation distance and 6 degrees at 100 m observation distance).

Example 3

For a coherent 1-dimensional volumetric source with length L=10 m, the broadband effective spatial extent will be: 1.1 m (160 degrees) at an observation distance of 0.1 m, 3.5 m (121 degrees) at an observation distance of 1 m, and 10 m at any observation distance larger than 8.2 m.

Example 4

For a coherent 1-dimensional volumetric source with length L=10 m, the effective spatial extent will be:

at f=100 Hz: 1.8 m (85 degrees) at an observation distance of 1 m and 10 m at any observation distance larger than 30 m;

at f=1000 Hz: 0.6 m (32 degrees) at an observation distance of 1 m and 10 m at any observation distance larger than 300 m.

Utilizing the Effective Spatial Extent in Rendering a Volumetric Audio Source

A renderer may use the derived effective spatial extent in various ways.

Setting a Target Spatial Extent:

The derived effective spatial extent may be used to set a target spatial extent for rendering a long volumetric audio source to a listener at a specific listening position. This will deliver a more appropriate rendered source width to the listener as compared to simply using the received geometrical extent data. For example, in one scenario, the derived effective spatial extent may be used for determining optimal positions of virtual stereo loudspeakers that are used to render the source to the listener at the specific listening position. In another scenario, the derived effective spatial extent may be used for setting a target spatial width in a spatial widening algorithm that is used to render the volumetric audio source to the listener at the specific listening position.

Determining a Spatial Window:

For a very long volumetric audio source, the derived effective spatial extent may be used to determine which part of the source to render at what moment in time to a listener who is moving along, away, and/or towards the source. This is like applying a spatial window that is sliding along with the listener, where the derived effective spatial extent (which is dynamically updated according to changes in the listener's position) determines the width of the spatial window.

Saving Computational Power:

In use cases where the audio from a volumetric audio source is rendered using some form of physical modeling, computational power may be saved by using the derived effective spatial extent to limit the part of the source that needs to be rendered to a listener at a specific listening position.

Extension to 2D and 3D Volumetric Audio Sources

The 1-dimensional quantitative parametric model discussed above is valid at least for volumetric audio sources that have a significant spatial extent in no more than one spatial dimension, meaning that the extent in the other two dimensions is small enough, relative to the observation distance, such that the extent in these dimensions does not significantly influence the effective spatial extent in the main (long) dimension. Especially this will be the case if, at a specific observation distance, the source essentially behaves like a point source in the other two dimensions.

The provisional patent application identified above describes a model for determining when, as a function of source length and observation distance, a 1-dimensional audio source behaves like a point source. Specifically, the document describes that a diffuse 1-dimensional audio source behaves like a point source at observation distances exceeding the source's length.

Thus, if a diffuse 2D volumetric audio source has two sizes in two dimensions—dimension 1 and dimension 2—where the size in dimension 1 is longer than the size in dimension 2, then the 1-dimensional quantitative effective spatial extent model of the Equation 6 can be applied to the dimension 1 of this 2D source if the size in dimension 2 is smaller than the observation distance D (or if the observation distance D is larger than $L_2$ which is the size in the dimension 2).

Similar criteria can also be obtained for the validity of the 1-dimensional Equations 7 and 8 for coherent 2D volumetric sources. In that case, the 1-dimensional model is valid if the size in the dimension 2 is less than (1) $18.4\sqrt{D/f}$ for the frequency-dependent model of the Equation 7 or (2) $21\sqrt{D}$ for the broadband model of Equation 8 (or equivalently if the observation distance is larger than $f(L^2)^2/339$ for the frequency-dependent model or $23(L^2)^2$ for the broadband model).

For example, if we have a 2D diffuse source with a width of 10 m and a height of 1 m, then its effective spatial extent (in the long dimension) can be calculated from the Equation 6 (with L=10 m) if the observation distance is larger than 1 m. For a fully coherent 2D source of the same size, the effective spatial extent (in the long dimension) at 500 Hz can be calculated from the Equation 8 if the observation distance is larger than 1.5 m.

These examples show that the requirements on the "1-dimensionalness" of a volumetric source in order for the 1-dimensional quantitative model of the Equations 6-8 to be applicable are quite loose, and that the 1-dimensional model can in fact be applied to a wide range of "long" 2D (and 3D) volumetric sources as well.

It should be noted that the quantitative criterion described above for the validity of the 1-dimensional model should be understood as indicative rather than as an exact boundary between the regions where the 1-dimensional model for the effective spatial extent does and does not apply. It provides a means to identify the types of 2D sources to which the 1-dimensional model may be applied, and/or the conditions under which a given 2D source may be modeled by the 1-dimensional model.

As such, an additional feature of the embodiments of this disclosure is that a renderer may determine, based on the above criterion, whether to apply the 1-dimensional model to a 2D or 3D volumetric source or not, and/or when to switch between rendering a 2D or 3D volumetric source according to the simplified 1-dimensional model and using a more complex 2D or 3D model.

For volumetric audio sources that have a significant extent in more than one dimension (thus not satisfying the criteria for being able to be considered as a 1-dimensional audio source as described above), the same qualitative model and principles described above still apply.

Generally speaking, enlarging the geometric spatial extent in one dimension has the effect of increasing the effective spatial extent in the other dimension(s). For example, in the comparison of a purely 1-dimensional source (i.e., a line source) having length L and a 2-dimensional source (i.e., a surface source) having length L and height H, for a given observation distance D, the effective extent of the 2-dimensional source along the dimension for the length L will be larger than for the 1-dimensional source. Also, the transition distance between the region where the effective spatial extent is a function of the observation distance and the region where it is simply equal to the physical size of the geometric extent is smaller for the surface source than for the line source. In other words, for a 2D surface source, the whole width of the source needs to be taken into account in the rendering already at a shorter distance than for an equally wide line source.

In the example above, the 2-dimensional surface source may be thought of as being constructed from a continuum of vertical line sources of size H distributed along the length L (instead of point sources as in the 1-dimensional model discussed above). Each of these vertical line sources has a more gradual distance attenuation than the 1/r attenuation of a point source, and thus points along the horizontal extent of the source need to be further away from the observation position to become insignificant (in terms of a given SPL-based significance criterion, e.g., the 1 dB SPL loudness JND criterion discussed above). The result of this is that, for a 2-dimensional surface source, the spatial extent in each dimension will be larger than for each of the two dimensions individually.

Note that the effective spatial extent in each dimension is still bounded by the geometric size of the extent in that dimension (i.e., the effective spatial extent will never exceed the geometric size).

The above explanation holds for rectangular 2D surface sources where the source power is distributed more or less uniformly over the surface. For this class of 2D sources, a simple extension of the 1-dimensional quantitative model of the equations 6-8 can be constructed as explained below.

The provisional application discloses a parametric model for the distance-dependent SPL attenuation function for finite-length 1-dimensional sources, basically identifying three different observation distance regions in which the source behaves like, respectively, a point source (at small source lengths and/or large observation distances), a line source (at large source lengths and/or small observation distances) and a transition region with intermediate behavior.

Then, for a uniform rectangular 2D surface source having width $L_1$ and height $L_2$, which as discussed above may be considered as being constructed of a continuous distribution of vertical line sources of length $L_2$, the SPL of each of these vertical line sources (at an observation distance D) may be determined from the equation 3 disclosed in the provisional application.

The total pressure response of the 2D surface source at an observation distance D can now be simulated by replacing the $1/r_i$ distance dependency (corresponding to point source pressure response) in the equation 1 provided above by the distance-dependent attenuation model of the equation 3 from the provisional application. In other words, the 2D surface source may be modelled as a 1-dimensional distribution of size $L_1$ of point-like sources that each have a distance attenuation function corresponding to a finite-length line source of size $L_2$.

Running such simulations for uniform 2D rectangular sources of various sizes resulted in the conclusion that the 1-dimensional model of equations 6-8 is valid also for these sources by only applying a simple scaling factor α to the resulting effective spatial extent for the dimension corresponding to $L_1$ (the width, in the example) in case the observation distance is smaller than $L_2$ (the height in this example), so that equation 6 is modified to:

$$\text{if } D < L_2 \text{(source is effectively 2}D\text{)}: L_{eff,L1} \approx \begin{cases} \alpha c_0 D; & D \le L_1/(\alpha c_0) \\ L_1; & D > L_1/(\alpha c_0) \end{cases}$$

$$\text{if } D \ge L_2 \text{(source is effectively 1}D\text{)}: L_{eff,L1} \approx \begin{cases} c_0 D; & D \le L_1/c_0 \\ L_1; & D > L_1/c_0 \end{cases}$$

where $L_{eff,L1}$ is the effective spatial extent in the dimension corresponding to $L_1$.

For a diffuse 2D rectangular source, the scaling factor α is a monotonic function of the ratio between $L_2$ (the source's height, in the example) and the observation distance D. The table below provides values for α as a function of $L_2/D$ as obtained from the simulations:

Table: scaling factor α as a function of the ratio $L_2$ and observation distance D.

| $L_2/D$ | 1 | 1.5 | 2 | 2.5 | 3 | 4 | 5 | 10 | 20 | 40 | 80 | 128 |
|---|---|---|---|---|---|---|---|---|---|---|---|---|
| a | 1 | 1.1 | 1.2 | 1.3 | 1.4 | 1.5 | 1.7 | 2.3 | 3.4 | 5.3 | 8.3 | 12 |

The effective spatial extent in the dimension corresponding to $L_2$, $L_{eff,L2}$ can be obtained in the same way as described above by exchanging the roles of $L_1$ and $L_2$.

For more arbitrarily shaped 2D and 3D extents and/or non-uniform power distributions, the same qualitative concept of the effective spatial extent according to the embodiments of this disclosure still applies.

For basic 2D and 3D geometric extent shapes (e.g., circle, sphere, cylinder, rectangle, box) with uniform power distribution, it is perfectly feasible to make specific parametric models for the effective spatial extent as a function of observation distance similar to the model above.

Implementation of Parametric Models

In some embodiments, the audio renderer determines the effective spatial extent of a volumetric audio source based on received information about the source's geometrical extent (e.g., physical size), shape, and/or other characteristics. In such embodiments, the parametric models described above may be implemented in the audio renderer, and the renderer determines the transition distance and the effective spatial extent from the parametric model(s), the received source information, and the listener distance.

In some embodiments, the renderer may receive parameters for configuring the parametric model(s), for example, in a bitstream. Specifically, the parameters $c_0$, $c_1$, and $c_2$ related to the selected SPL threshold sound level difference value used by the model may be received by the renderer.

Other model parameters that may be sent to the audio renderer in a bitstream as source specific metadata are:

(1) Coherence data for a volumetric source, instructing the renderer which of the versions of the parametric model (diffuse, coherent broadband, or coherent frequency-dependent) to use or specifying a mixture (possibly frequency-dependent) of versions of the model (e.g., using the coherent frequency-dependent model for low frequencies, the diffuse model for high frequencies, and a mixture of these two models at intermediate frequencies).

(2) A flag indicating that the source should be considered as "infinitely long". In this case, the renderer may ignore the source's geometric extent data for determining the effective spatial extent and may always use the equation for distances smaller than the transition distance for determining the effective spatial extent for the source.

(3) A flag instructing the renderer whether to use the effective spatial extent model for the source or not. It may not always be appropriate or desired to use the model for a specific volumetric source. This may be the case, for example, for a volumetric source that does not radiate sound from its full extent but is merely a conceptual volume that contains a limited number of individual sound sources.

In other embodiments, the parametric model(s) may be implemented outside the renderer, for example, in an encoder. In such scenarios, the transition distance and/or effective spatial extent for observation distances smaller than the transition distance (which, in case of a diffuse 1-dimensional audio source, is a constant in terms of an opening angle) are transmitted to the renderer. In these embodiments, the renderer does not need to implement the parametric model(s) as such but only needs to be able to switch between two "spatial extent modes" for rendering a source: one mode where it uses the received geometrical extent for rendering (which is constant in terms of absolute size), and an alternative mode where it uses the received effective spatial extent (which is constant in relative terms of angle), where the received transition distance is used as selection criterion between the two modes.

As briefly mentioned above, the quantitative parametric model assumes a uniform source power distribution over the extent. Although this limits the application of the quantitative model to sources that are "reasonably" uniform, there are many relevant types of sources that satisfy this criterion (e.g., a busy highway, the shoreline of the sea, high-speed trains, etc.).

In the disclosure above, only a central observation position was considered. In case of a non-central observation position, however, the same qualitative conceptual model still applies. For very long sources (specifically infinitely long sources), the lateral observation position is of no relevance for the effective spatial extent, and thus the quantitative parametric model applies to any observation position.

The provisional application describes how the coherence properties of a volumetric source and the treatment of partially coherent volumetric source are determined.

Exemplary System and/or Method

Figure 5:
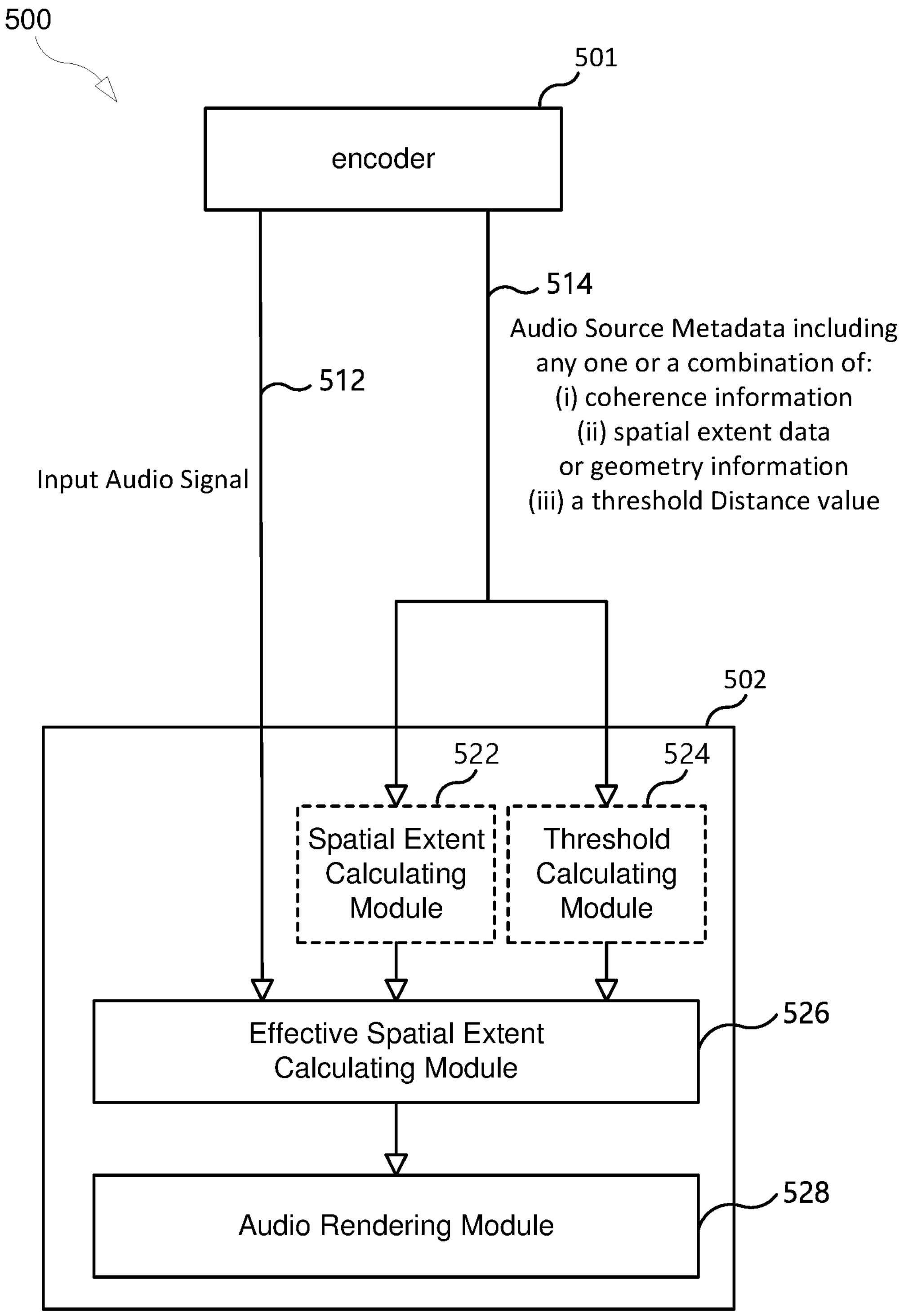
FIGS. 5-7B show systems according to some embodiments.

FIG. 5 shows an example system 500 for rendering an audio source according to some embodiments of this disclosure. The system 500 includes an encoder 501 and an audio renderer 502. The audio renderer 502 includes effective spatial extent calculating module 526 and audio rendering module 528. Optionally, the audio renderer 502 may also include spatial extent calculating module 522 and threshold distance value calculating module 524.

In the system 500, the renderer 502 receives from the encoder 501 an audio input signal 512 and audio source metadata 514. The metadata 514 may include any one or a combination of: (i) coherence information associated with an audio source, (ii) spatial extent data or geometry information associated with the audio source, and/or (iii) a threshold distance value needed for calculating an effective spatial extent of the audio source. The coherence information indicates coherence property of the audio source, which, for example, indicates that the audio source is a coherent source or a diffuse source. The geometry information indicates a geometry of the audio source.

If the metadata 514 includes the spatial extent data and the threshold distance value, the effective spatial extent calculating module 526 calculates the effective spatial extent of the audio source based on the spatial extent data, the threshold distance value, and a distance value specifying the distance between the audio source and the listener, and the rendering module 528 renders the audio source using the effective spatial extent of the audio source.

If the metadata 514 includes the spatial extent data, but not the threshold distance value, the threshold distance value calculating module 524 calculates the threshold distance value based on the received spatial extent data. Then, the effective spatial extent calculating module 526 calculates the effective spatial extent of the audio source based on the spatial extent data, the threshold distance value, and a distance value specifying the distance between the audio source and the listener, and the audio rendering module 528 renders the audio source using the effective spatial extent of the audio source.

If the metadata 514 includes neither the spatial extent data nor the threshold distance value but includes the geometry information, the spatial extent calculating module 522 calculates the spatial extent based on the geometry information and the threshold distance value calculating unit 524 calculates the threshold distance value based on the calculated spatial extent. Then, the effective spatial extent calculating module 526 calculates the effective spatial extent of the audio source based on the calculated spatial extent data, the calculated threshold distance value, and a distance value specifying the distance between the audio source and the listener, and the audio rendering module 528 renders the audio source using the effective spatial extent of the audio source.

Figure 6:
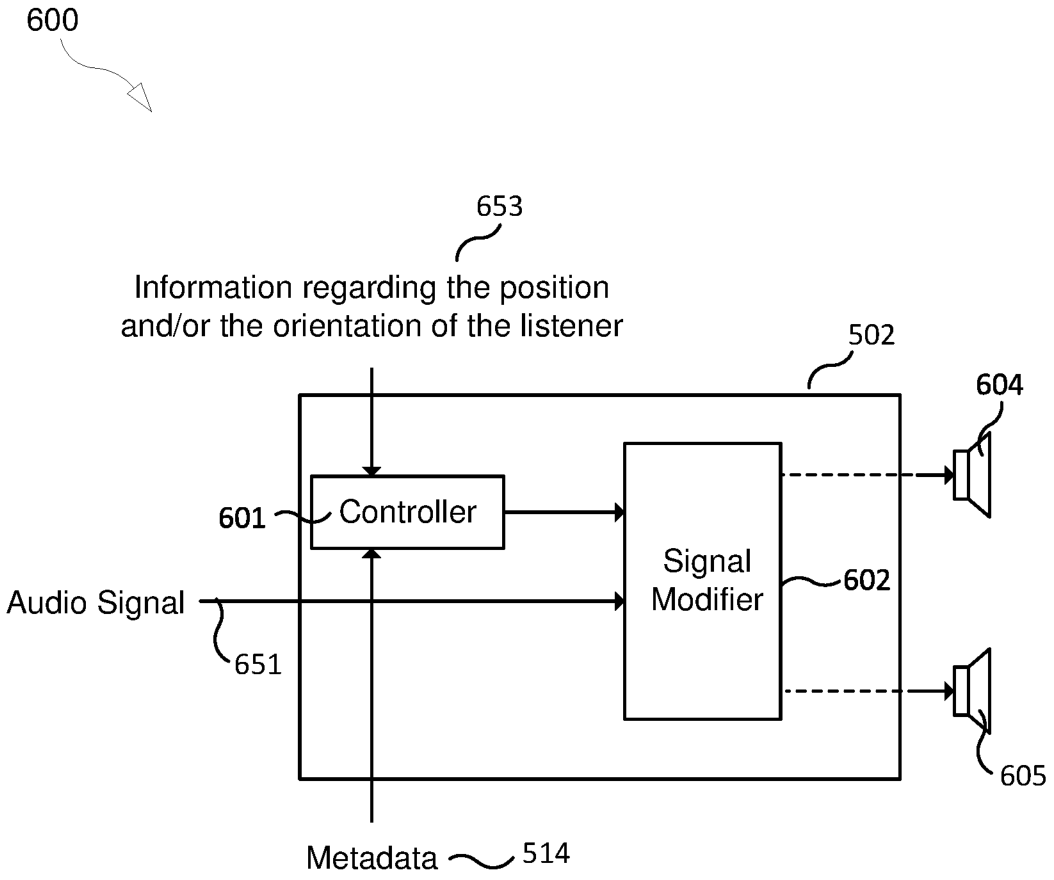

FIG. 6 shows an example renderer 502 for producing sound for a XR scene. System 600 includes a controller 601, a signal modifier 602 for modifying an audio signal 651 (e.g., a multi-channel audio signal), a left speaker 604, and a right speaker 605. While one audio signal and two speakers are shown in FIG. 6, this is for illustration purpose only and does not limit the embodiments of the present disclosure in any way. Controller 601 may be configured to receive one or more parameters and to trigger signal modifier 602 to perform modifications on audio signal 651 based on the received parameters (e.g., increasing or decreasing the volume level). The received parameters include (1) information 653 regarding the position of the listener (e.g., direction and distance to an audio source) and (2) metadata 514 regarding the audio object as described herein.

Figure 7A:
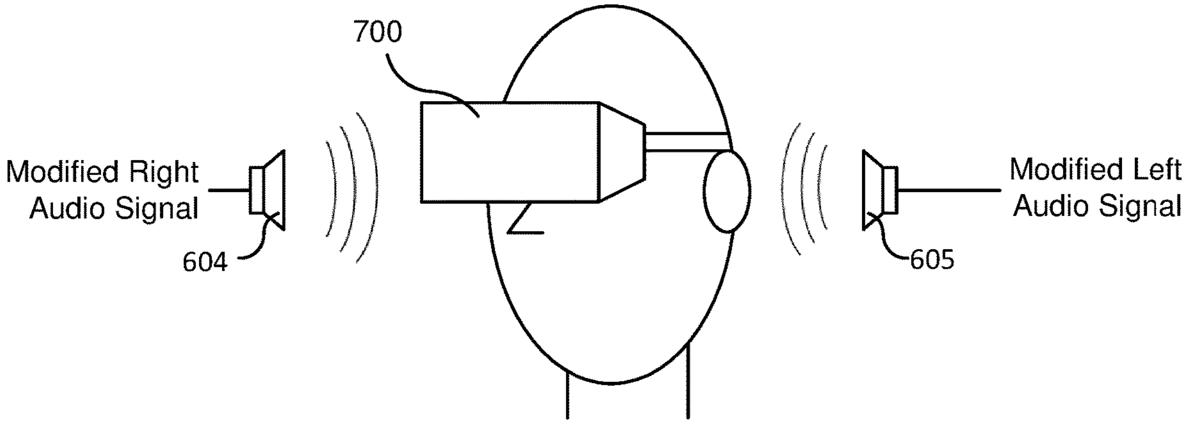
Figure 7B:
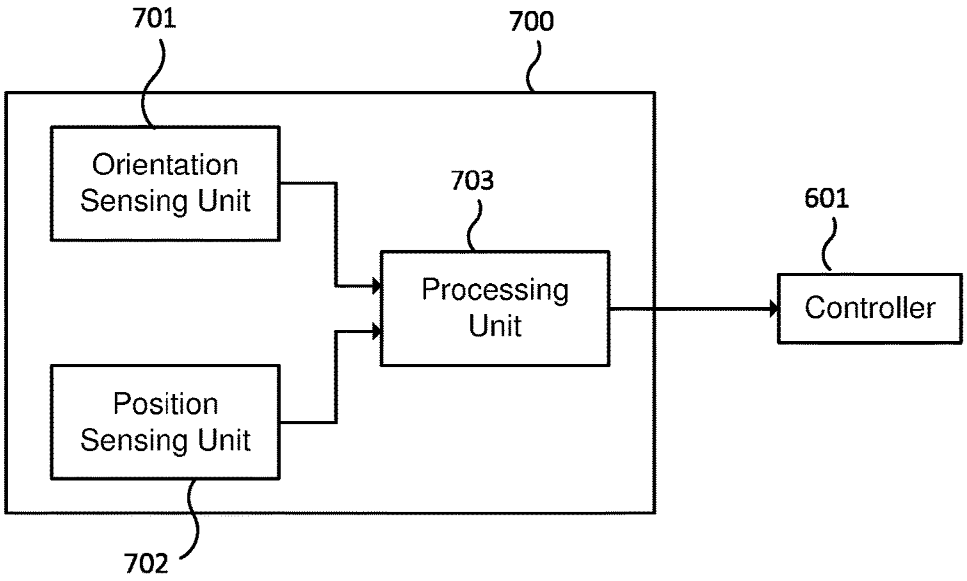

In some embodiments of this disclosure, information 653 may be provided from one or more sensors included in an XR system 700 illustrated in FIG. 7A. As shown in FIG. 7A, XR system 700 is configured to be worn by a user. As shown in FIG. 7B, XR system 700 may comprise an orientation sensing unit 701, a position sensing unit 702, and a processing unit 703 coupled to controller 601 of system 600. Orientation sensing unit 701 is configured to detect a change in the orientation of the listener and provides information regarding the detected change to processing unit 703. In some embodiments, processing unit 703 determines the absolute orientation (in relation to some coordinate system) given the detected change in orientation detected by orientation sensing unit 701. There could also be different systems for determination of orientation and position, e.g. the HTC Vive system using lighthouse trackers (lidar). In one embodiment, orientation sensing unit 701 may determine the absolute orientation (in relation to some coordinate system) given the detected change in orientation. In this case the processing unit 703 may simply multiplex the absolute orientation data from orientation sensing unit 701 and the absolute positional data from position sensing unit 702. In some embodiments, orientation sensing unit 701 may comprise one or more accelerometers and/or one or more gyroscopes.

Figure 8:
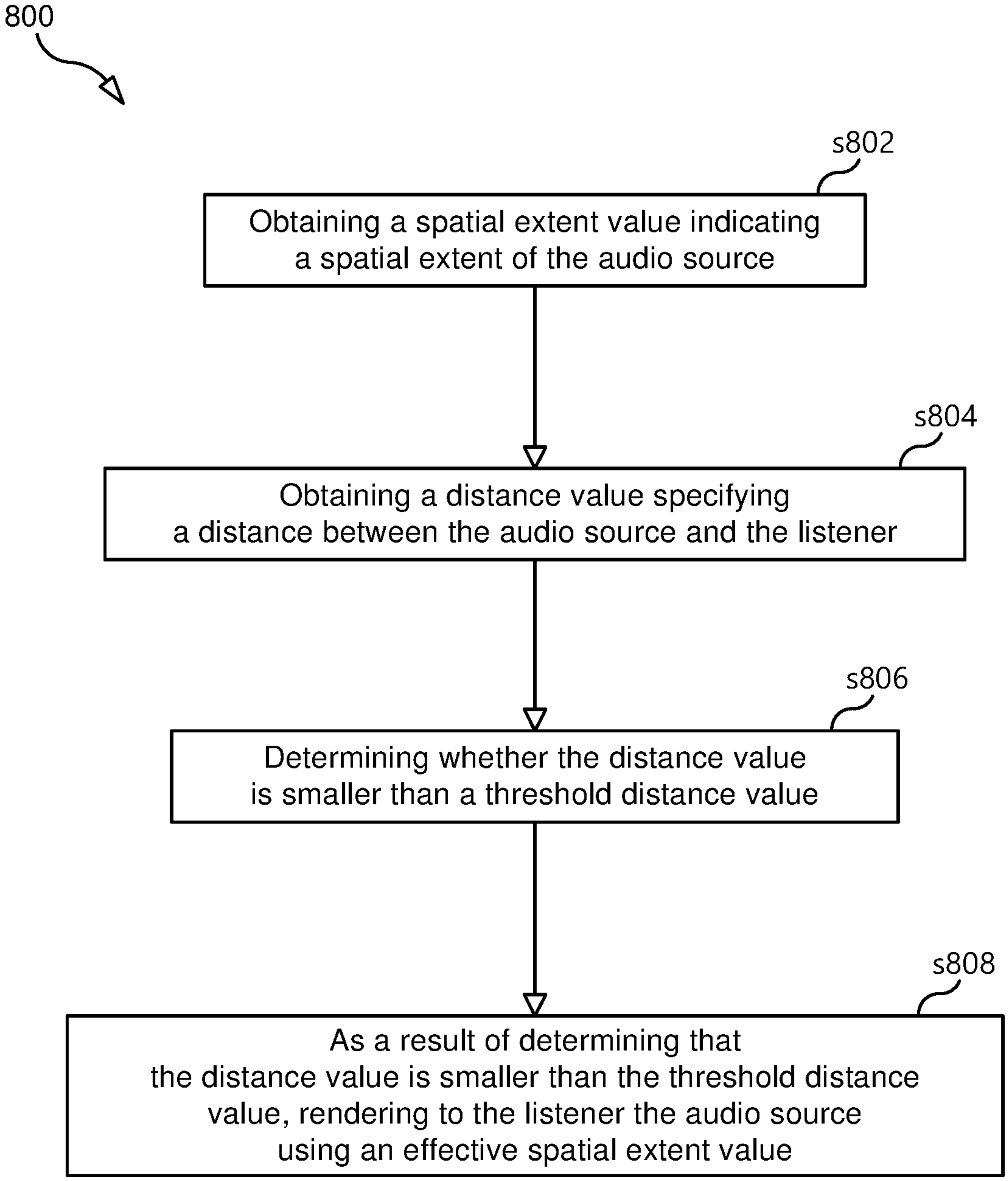
FIG. 8 is a process according to an embodiment.

FIG. 8 is a flow chart illustrating a process 800 according to one embodiment for rendering an audio source for a listener. Process 800 may begin in step s802 and may be performed by renderer 502. Step s802 comprises obtaining at least a first spatial extent value indicating a first spatial extent of the audio source. Step s804 comprises obtaining a distance value specifying a distance between the audio source and the listener. Step s806 comprises determining whether the distance value is smaller than a threshold distance value. Step s808 comprises as a result of determining that the distance value is smaller than the threshold distance value, rendering to the listener the audio source using an effective spatial extent value.

In some embodiments, the threshold distance value is a function of the first spatial extent value. In some embodiments, the effective spatial extent value is a function of the distance value.

In some embodiments, the effective spatial extent value is proportional to a power of the distance value, wherein the power has a value between 0.5 and 1.

In some embodiments, the process 800 further comprises obtaining coherence property information. The coherence property information indicates a degree of coherence for the audio source. Accordingly, the coherence property information can be used to make determination as to whether the audio source is a coherent source, a diffuse source, or a mixture of these.

In some embodiments, the process 800 further comprises calculating the effective spatial extent value based on the obtained coherence property information.

In some embodiments, the process 800 further comprises based on the obtained coherence property information, determining whether the audio source is one of either a diffuse source or a coherent source.

In the case that the source is a diffuse source, calculating the effective spatial extent value comprises calculating the effective spatial extent value based on $C_0 \times D$, where $C_0$ is a constant and D is the obtained distance value.

In the case that the source is a coherent source, calculating the effective spatial extent value comprises calculating the effective spatial extent value based on $C_1 \times \sqrt{D}$, where $C_1$ is a constant and D is the obtained distance value.

In some embodiments, the effective spatial extent value is used to identify a segment of the audio source, wherein the identified segment of the audio source is the acoustically relevant segment of the audio source for the listener.

In some embodiments, obtaining the first spatial extent value comprises receiving from an encoder metadata associated with the audio source. The metadata includes geometry information associated with the audio source. Obtaining the first spatial extent value further comprises deriving the first spatial extent value based on the geometry information included in the metadata.

In some embodiments, the process 800 further comprises receiving metadata associated with the audio source, wherein the metadata includes (i) a flag indicating that the size of the audio source is essentially infinite and/or (ii) a flag instructing whether to use an effective spatial extent model to render the audio source.

In some embodiments, rendering the audio source comprises determining positions for one or more virtual loudspeakers based on the effective spatial extent value, and using said one or more virtual loudspeakers to render the audio source.

In some embodiments, the audio source is an essentially one-dimensional (1D) audio source.

In some embodiments, the audio source is a two-dimensional (2D) audio source or a three-dimensional (3D) audio source, and the process 800 comprises receiving from an encoder metadata including a flag which indicates whether to use a 1D effective spatial extent model to render the 2D or 3D audio source.

In some embodiments, the audio source is a two-dimensional (2D) audio source (i.e., the audio source has a first spatial extent in a first spatial dimension (e.g., a width) and the audio source has a second spatial extent in a second spatial dimension (e.g., a height)) or a three-dimensional (3D) audio source (i.e., the audio source has: a first spatial extent in a first spatial dimension (e.g., a width), a second spatial extent in a second spatial dimension (e.g., a height), and a third spatial extent in a third spatial dimension (e.g., a depth)), and the process 800 comprises determining whether a 1D effective spatial extent model described herein can be used to render the 2D or 3D audio source and/or when to switch between (i) rendering the 2D or 3D audio source according to the 1D model and (ii) using a more complex 2D or 3D model. As described above, the determination as to whether a 2D or 3D audio source can be rendered using the 1D effective spatial extent of the audio source may be based on the size of the other one or two dimensions and the observation distance. For example, given a 2D audio source having a width (L) of 50 meters and height (H) of 1 meter, the render may be configured such that, based on H and the observation distance (e.g., based on determining that the observation distance >H), the render determines that the audio source can be rendered as a 1D audio source having an effective length of $L_{eff}$, where $L_{eff} < L$.

Accordingly, in some embodiments, the first spatial extent of the audio source is a spatial extent in a first spatial dimension, and the method further comprises: i) obtaining a second spatial extent value indicating a second spatial extent of the audio source, the second spatial extent being a spatial extent in a second spatial dimension and ii) determining whether or not to derive the effective spatial extent value as if the audio source has a spatial extent in only one spatial dimension. In some embodiments, determining whether or not to derive the effective spatial extent value as if the audio source has a spatial extent in only one spatial dimension comprises receiving a flag indicating that the effective spatial extent value may be derived as if the audio source has a spatial extent in only one spatial dimension. In some embodiments, determining whether or not to derive the effective spatial extent value as if the audio source has a spatial extent in only one spatial dimension comprises determining: i) whether a difference between the first or second spatial extent value and the distance value is greater than a threshold, or ii) whether a difference between the first or second spatial extent value and a value that is a function of the distance value is greater than a threshold. In some embodiments, if the audio source is a diffuse audio source, then the method comprises determining whether the difference between the first or second spatial extent value and the distance value is greater than a threshold, and if the audio source is not a diffuse audio source, then the method comprises determining whether the difference between the first or second spatial extent value and the value that is a function of the distance value is greater than a threshold. In some embodiments, determining whether the difference between the first or second spatial extent value and the distance value is greater than a threshold consists of determining whether the distance value is greater than the first or second spatial extent value.

Figure 9:
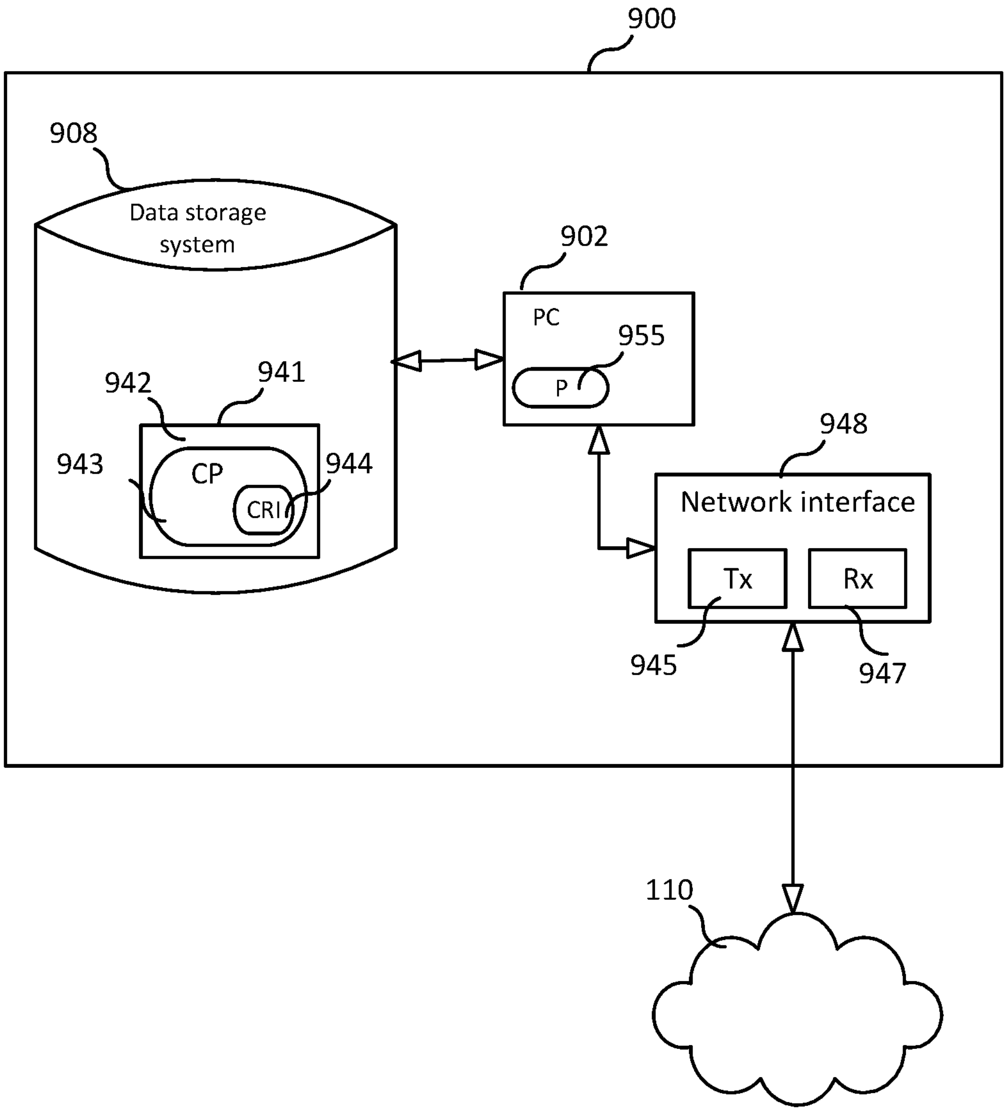
FIG. 9 is an apparatus according to an embodiment.

FIG. 9 is a block diagram of an apparatus 900, according to some embodiments, for implementing system 500 or a portion of system 500 (e.g., renderer 502) and/or system 600. As shown in FIG. 9, apparatus 900 may comprise: processing circuitry (PC) 902, which may include one or more processors (P) 955 (e.g., a general purpose microprocessor and/or one or more other processors, such as an application specific integrated circuit (ASIC), field-programmable gate arrays (FPGAs), and the like), which processors may be $c_0$-located in a single housing or in a single data center or may be geographically distributed (i.e., apparatus 900 may be a distributed computing apparatus); at least one network interface 948, were each network interface 948 comprises a transmitter (Tx) 945 and a receiver (Rx) 947 for enabling apparatus 900 to transmit data to and receive data from other nodes connected to a network 110 (e.g., an Internet Protocol (IP) network) to which network interface 948 is connected (directly or indirectly) (e.g., network interface 948 may be wirelessly connected to the network 110, in which case network interface 948 is connected to an antenna arrangement); and one or more storage units (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes apparatus 900 to perform steps described herein (e.g., steps described herein with reference to the flow charts). In other embodiments, apparatus 900 may be configured to perform steps described herein without the need for code. That is, for example, PC 902 may consist merely of one or more ASICs. Hence, the features of the embodiments described herein may be implemented in hardware and/or software.

The embodiments described above provide at least several advantages. For example, using the effective spatial extent according to the embodiments of this disclosure for a large volumetric audio source enables a more natural and realistic spatial rendering of the source than directly using the source's geometrical extent. Also compared to directly specifying an intended perceived spatial extent of a volumetric audio source, which is only valid for a specific listening position, the modeled effective spatial extent according to the embodiments of this disclosure is valid at any listening position. Furthermore, in some rendering scenarios, the methods and the systems according to the embodiments of this disclosure enable better computational efficiency in rendering the audio of a large volumetric audio source as only parts of the geometrical extent that are acoustically relevant at the given listening position are considered in the rendering. As another example, in the embodiments of this disclosure, the parametric model for determining the effective spatial extent is very simple and can easily be implemented as a light-weight add-on to existing render architectures.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes and message flows described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for rendering an audio source for a listener, the method comprising:

obtaining at least a first spatial extent value indicating a first spatial extent of the audio source;

obtaining a distance value specifying a distance between the audio source and the listener;

determining whether the distance value satisfies a criterion, wherein determining whether the distance value satisfies the criterion comprises determining whether the distance value is not greater than a threshold distance value, and the threshold distance value is a function of the first spatial extent value; and as a result of determining that the distance value satisfies the criterion, rendering to the listener the audio source using an effective spatial extent value, wherein the effective spatial extent value is a function of the distance value.

2. The method of claim 1, wherein the method further comprises receiving metadata comprising the effective spatial extent value.

3. The method of claim 2, wherein the effective spatial extent value is an opening angle value.

4. The method of claim 1, wherein the effective spatial extent value is proportional to a power of the distance value, wherein the power has a value between and inclusive of 0.5 and 1.

5. The method of claim 1, the method further comprising obtaining coherence property information, wherein the coherence property information indicates a degree of coherence for the audio source.

6. The method of claim 5, the method further comprising calculating the effective spatial extent value based on the obtained coherence property information.

7. The method of claim 6, the method further comprising:

based on the degree of coherence for the audio source, determining whether the audio source is any of a diffuse source, a coherent source, or a mix of a diffuse source and a coherent source.

8. The method of claim 1, wherein in case the source is a diffuse source, calculating the effective spatial extent value comprises calculating the effective spatial extent value based on $C_0 \times D$, where $C_0$ is a constant and D is the distance value.

9. The method of claim 1, wherein in case the source is a coherent source, calculating the effective spatial extent value comprises calculating the effective spatial extent value based on $C_1 \times \sqrt{D}$, where $C_1$ is a constant and D is the distance value.

10. The method of claim 1, wherein the effective spatial extent value is used to identify a segment of the audio source, wherein the segment of the audio source is the acoustically relevant segment of the audio source for the listener.

11. The method of claim 10, wherein rendering the audio source comprises rendering only the identified segment of the audio source.

12. The method of claim 1, wherein obtaining the first spatial extent value comprises (i) receiving from an encoder metadata associated with the audio source, wherein the metadata includes geometry information associated with the audio source and (ii) deriving the first spatial extent value based on the geometry information included in the metadata.

13. The method of claim 1, the method further comprising receiving metadata associated with the audio source, wherein the metadata includes (i) a flag indicating that the size of the audio source is essentially infinite and/or (ii) a flag instructing whether to use an effective spatial extent model to render the audio source.

14. The method of claim 1, wherein rendering the audio source comprises:

determining positions for one or more virtual loudspeakers based on the effective spatial extent value, and using said one or more virtual loudspeakers to render the audio source.

15. The method of claim 1, wherein the audio source is essentially a one-dimensional (1D) audio source.

16. The method of claim 1, wherein the first spatial extent of the audio source is a spatial extent in a first spatial dimension, and the method further comprises:

obtaining a second spatial extent value indicating a second spatial extent of the audio source, the second spatial extent being a spatial extent in a second spatial dimension; and determining whether or not to derive the effective spatial extent value as if the audio source has a spatial extent in only one spatial dimension.

17. The method of claim 16, wherein determining whether or not to derive the effective spatial extent value as if the audio source has a spatial extent in only one spatial dimension comprises receiving a flag indicating that the effective spatial extent value may be derived as if the audio source has a spatial extent in only one spatial dimension.

18. The method of claim 16, wherein determining whether or not to derive the effective spatial extent value as if the audio source has a spatial extent in only one spatial dimension comprises determining:

i) whether a difference between the first or second spatial extent value and the distance value is greater than a threshold, or ii) whether a difference between the first or second spatial extent value and a value that is a function of the distance value is greater than a threshold.

19. The method of claim 18, wherein if the audio source is a diffuse audio source, then the method comprises determining whether the difference between the first or second spatial extent value and the distance value is greater than a threshold, and if the audio source is not a diffuse audio source, then the method comprises determining whether the difference between the first or second spatial extent value and the value that is a function of the distance value is greater than a threshold.

20. The method of claim 18, wherein determining whether the difference between the first or second spatial extent value and the distance value is greater than a threshold consists of determining whether the distance value is greater than the first or second spatial extent value.

21. A non-transitory computer readable storage medium storing a computer program comprising instructions which when executed by processing circuitry of an apparatus causes the apparatus to perform the method of claim 1.

22. An apparatus for rendering an audio source for a listener, the apparatus comprising:

a memory; and processing circuitry coupled to the memory, wherein the processing circuitry is configured to cause the apparatus to:

obtain a spatial extent value indicating a spatial extent of the audio source;

obtain a distance value specifying a distance between the audio source and the listener;

determine whether the distance value satisfies a criterion, wherein determining whether the distance value satisfies the criterion comprises determining whether the distance value is not greater than a threshold distance value, and the threshold distance value is a function of the spatial extent value; and as a result of determining that the distance value satisfies the criterion, render to the listener the audio source using an effective spatial extent value, wherein the effective spatial extent value is a function of the distance value.

23. An apparatus for rendering an audio source for a listener, the apparatus comprising:

a memory; and processing circuitry coupled to the memory, wherein the processing circuitry is configured to cause the apparatus to:

obtain a size value, L, indicating a geometrical size of an extent of the audio source;

obtain a distance value, D, specifying a distance between the audio source and the listener;

based on L and D, set an effective spatial extent value equal to either a first value or a second value; and render to the listener the audio source using the effective spatial extent value, wherein the apparatus is configured to set the effective spatial extent value to the first value if D is not greater than a threshold, wherein the threshold is a function of L, otherwise the apparatus sets the effective spatial extent value to the second value.

24. The apparatus of claim 23, wherein the apparatus is further configured to set the position of a virtual loudspeaker based on the effective spatial extent value.

25. The apparatus of claim 23, wherein the size value is a length value indicating a length of the extent, the threshold is equal to L/6, the first value is equal to 6D, and the second value is equal to L.

* * * * *